FIG.5a  FIG.5b

LOW ALTITUDE

__United States Patent Office__

3,309,703
Patented Mar. 14, 1967

3,309,703
PULSED RADAR ALTIMETER
Milton H. Ammon, Van Nuys, Warren J. Kennedy, Northridge, Lambert F. Lyons, San Fernando, and Ronald C. Mead, Van Nuys, Calif., assignors to The Bendix Corporation, North Hollywood, Calif., a corporation of Delaware
Filed Apr. 24, 1961, Ser. No. 104,936
13 Claims. (Cl. 343—13)

This invention relates to echo-ranging systems and more particularly to radar altimeters employing pulsed transmissions.

The advantages of radio and radar altimeters as compared to aneroid altimeters is well recognized in that the high speed of radiation of electromagnetic waves, to wit 186,000 miles per second, allows the continuous monitoring of absolute rather than barometric altitude of a fast flying aircraft with an order of accuracy impossible with the aneroid type devices. Radio type altimeters to date have employed frequency modulation techniques but have definite limited utility because of Doppler effect and interference by sonic noise in the modulation frequency range. Of course, one very real difficulty in the use of pulsed radar techniques for determining altitude is that the measurement of the pulse-echo interval becomes quite difficult, particularly if the altitude of the aircraft is to be measured during take-off and landings where the pulse-echo interval may be in the order of 4 nanoseconds ($4 \times 10^{-9}$ seconds). In addition to the time measurement problem, the usual technique in radar systems of disabling the receiver during transmission to avoid the reception of leakage energy and other unwanted reflections rather than the ground return becomes completely inadequate. At low altitudes, if it is desired to disable the receiver during the pulse period, a timing circuit of even greater accuracy than the time-measurement system would be required.

One further difficulty encountered in pulsed radar altimeters is that the tremendous range of power levels of the echo, in normal operation, is so great that some form of automatic gain control of the receiver is essential in order to discriminate against leakage and background noise.

All of these problems are solved in accordance with this invention, one embodiment of which comprises a pulse transmitter made up of a cavity type oscillator which is periodically triggered by a modulator which, in turn, is under the control of a pulsed rate frequency generator. The oscillator is coupled to an antenna through a microwave switch normally in its energy-conducting condition. Control circuitry is included for periodically opening the switch to disable the transmission during selected cycles and additionally to vary the transmitted pulse width as a function of the measured altitude.

The receiver portion of the altimeter system includes a superregenerative receiver coupled to the receiving antenna. A pulse generator under the control of a timing system is connected to the superregenerative receiver to periodically enable the receiver for the reception of pulses.

The time-measurement system includes a slow ramp generator which is free-running, a fast ramp generator which is triggered by the pulse rate frequency generator to start an excursion with each transmitted pulse, and a voltage comparator which enables the receiver for a brief period of time following each pulse transmission.

Time measurement is accomplished in accordance with this invention by the use of an accurate ramp which is initiated by the transmission of the pulse and terminated upon the instant that the receiver is enabled. The altimeter includes additionally a peak detector for detecting the highest level of the ramp and an indicator to register that level in terms of altitude.

An automatic gain stabilization circuit is operative at all times except during the actual pulse transmission period and is connected to vary the sensitivity of the receiver.

The altimeter also includes a gate controlling the period during which the microwave switch is in its conducting condition for a period of time which is a function of the instantaneous amplitude of the slow ramp whereby the transmitted pulses vary in width from extremely narrow pulse at low altitude to a broader pulse at high altitude.

A first feature of this invention resides in the time-measurement system including an accurate ramp voltage generator which is started by the transmitted pulse and includes additionally means for terminating the ramp at the instant the receiver is enabled, independent of the waveform of the received echo and, moreover, independent of whether the system receives an echo.

A second feature of this invention relates to the presence in the altimeter of means responsive to the measured altitude for varying the transmitted pulse width to allow adequate transmitted energy at high altitudes and to provide a narrow pulse at low altitudes for ease of accurate measurement.

Another feature of this invention resides in the presence of a timing circuit which periodically disables the transmission portion of the system while enabling the automatic gain control circuit to adjust the level of sensitivity of the receiver responsive to ambient noise and/or leakage energy from the transmission portion of the system.

These and other features of this invention may be clearly understood from the following detailed description and by reference to the drawing in which.

Figure 1:
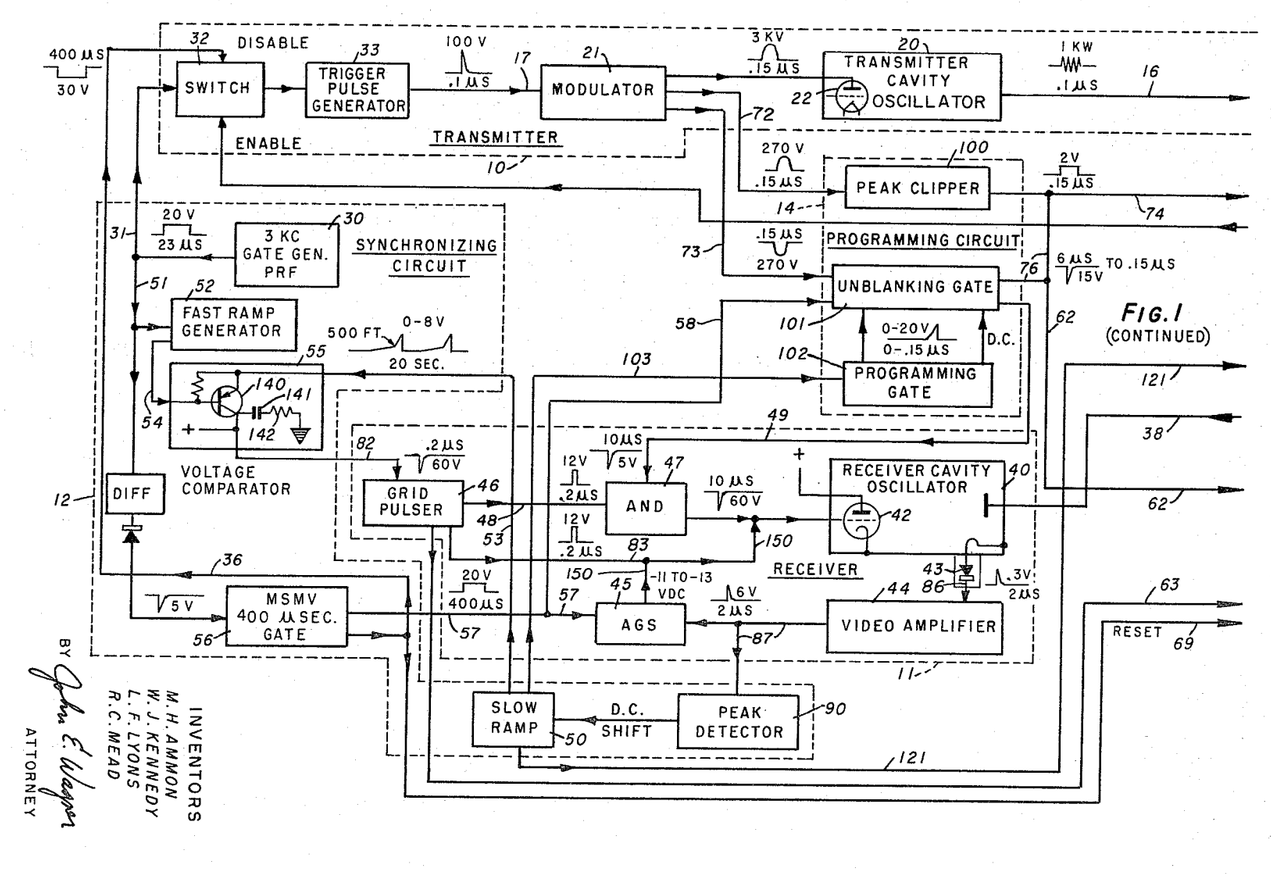
FIG. 1 is a block diagram of the altimeter of this invention.

Referring now to FIG. 1, the altimeter of this invention involves basically five component circuits: a transmitter 10, a receiver 11, a synchronizing circuit 12 for sequencing the operation of the altimeter, a time comparator circuit 13 for converting the information developed by the system into an indication of altitude, and a programming circuit 14 for controlling the pulse width of the transmitted RF energy.

TRANSMITTER

Referring first to the transmitter, it employs a cavity type oscillator 20 designed for operation at a frequency of 4,300 megacycles with a transmitted pulse rate in the order of 1.5 kilocycles. Peak power output varies as a function of altitude under the control of the programming circuit 14 from a level of 10 watts at a low altitude to in the order of 1 kilowatt at high altitude, with the transmitted pulse length varying from approximately 6 to 100 nanoseconds with altitude. The cavity oscillator 20 is driven by a solid state modulator 21 injecting a 3 kv. pulse on the plate of a triode 22 forming a part of the cavity oscillator 20. The output of the oscillator 20 is coupled through lead 16 to a pair of coaxial switches 23 and 24 which allow the transmission of the RF energy from the oscillator through a microwave switch 25 to a transmitting antenna 26 or allow the bypassing of the RF energy arounnd the microwave switch 25, as required in accordance with a feature of this invention described below. The cavity oscillator 20 may be a cylindrical cavity dimensioned to resonate in the 4000-megacycle range which mounts therein a microwave triode as the amplifier portion of the oscillator. A typical microwave triode type for use therein is a General Electric Co. type 6771.

The transmitting cycle of the altimeter is under the basic control of a 3-kc. pulse rate frequency generator 30 forming a part of the synchronizing circuit 12. Output from the PRF generator 30 passes through a lead 31, a normally closed switch 32 and a trigger pulse-generating network 33 which supplies a 100-volt pulse to the modulator 21. At low altitudes the modulator 21 is fired at the 3-kc. rate. At high altitudes the switch 32 is periodically opened and the modulator triggered only at a 1.5-kc. rate.

RECEIVER

The receiver 11 of the altimeter includes as a basic element a superregenerative oscillator 40 of the cavity type similar to the transmitter oscillator 20 employing for example a microwave triode of the General Electric Co. type 6442. The oscillator 40 is connected to a receiving antenna 41 through lead 38 and including a triode 42 normally grid-biased to cut-off. The oscillator 40 is operated in the linear mode. Coupled to the receiver oscillator 40 is a video detector 43 followed by a video amplifier 44 in order to provide an amplified enevelope of any energy in the receiver cavity 40. Automatic gain control of the cavity is employed in the receiver circuit 11 with the presence of an automatic gain stabilization circuit 45 connected between the output of the video amplifier 44 and the grid of triode 42 in the receiver oscillator 40.

The receiver oscillator 40 normally maintained in a cut-off condition is periodically energized by a grid pulse-generating circuit or grid pulser 46 under the control of the synchronizing circuit 12. The receiver 11 also includes a blanking circuit in the form of a coincidence gate 47 for overriding the enabling pulse from the grid pulser 46 to blank the receiver and prevent it from locking onto unwanted signals. The grid pulser 46 has the function of generating a flat-top pulse in the order of 0.2 microsecond in length and 12 volts in magnitude from a 0.2 microsecond voltage spike input from the voltage comparator 55. This function of pulse forming or regeneration may be accomplished by any of several well known circuits such as the Schmitt trigger as shown in the General Electric Co. Transistor Manual, fifth edition (1960), on page 122 in FIG. 11.14 or a monostable multivibrator of the type shown in Millman and Taub, Pulse and Digital Circuits, copyright 1956, on page 600 in FIGS. 18–35.

SYNCHRONIZING CIRCUIT

The synchronizing circuit 12 of the altimeter includes two independent, free-running signal sources, the first being the pulse rate frequency generator 30 which produces a square pulse in the order of 23 microseconds length at the 3-kc. rate and a triangular wave or slow ramp generator 50 which produces a relatively linear rise waveform having a period of 20 seconds. In the range of operating rates of the transmitter 10 and the other timing elements of the altimeter, the output of the slow ramp generator appears as a slowly increasing unidirectional voltage.

The output of the PRF generator 30, in addition to its function in initiating the transmitting cycle through switch 32 is introduced via lead 51 as a triggering input to a fast ramp voltage generator 52. The output of the slow ramp generator 50 and of the fast ramp generator 52 are both introduced via leads 53 and 54 respectively into a voltage comparator 55 which produces an output pulse when the input voltages are equal. The voltage comparator 55 is connected as the triggering input to the grid pulser 46 which periodically enables the receiver cavity 40.

Figures 5A, 5B:
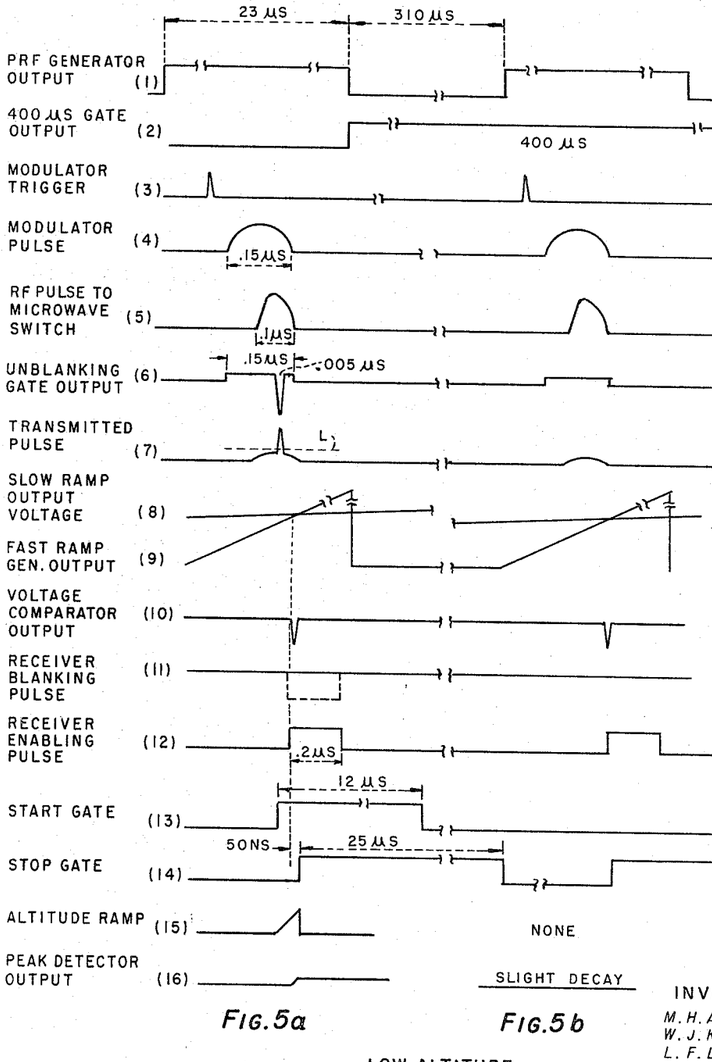
FIGS. 5a and 5b are time-sequence diagrams of the waveforms of significant portions of the altimeter while measuring low altitudes.
Figure 6A:
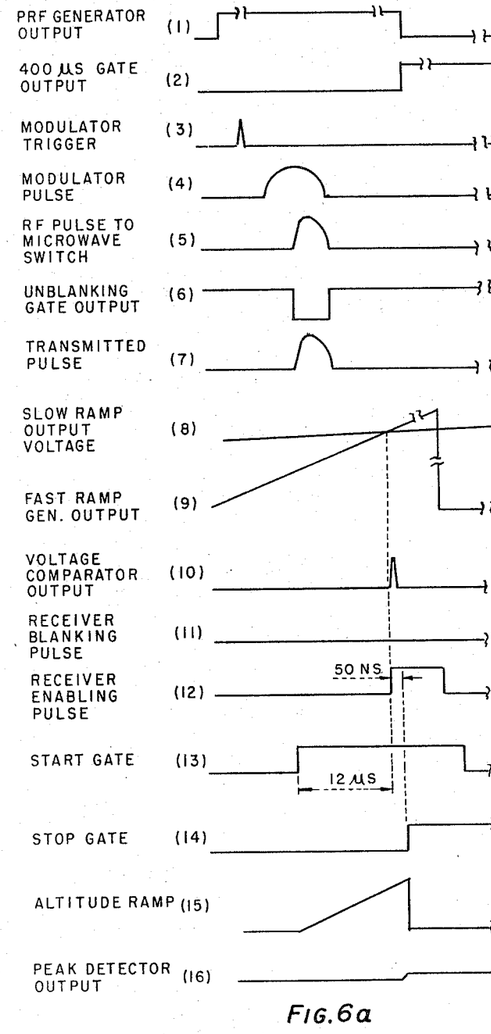
FIGS. 6a and 6b are time-sequence diagrams similar to FIGS. 5a and 5b, only representing high-altitude measurement.
Figure 6B:
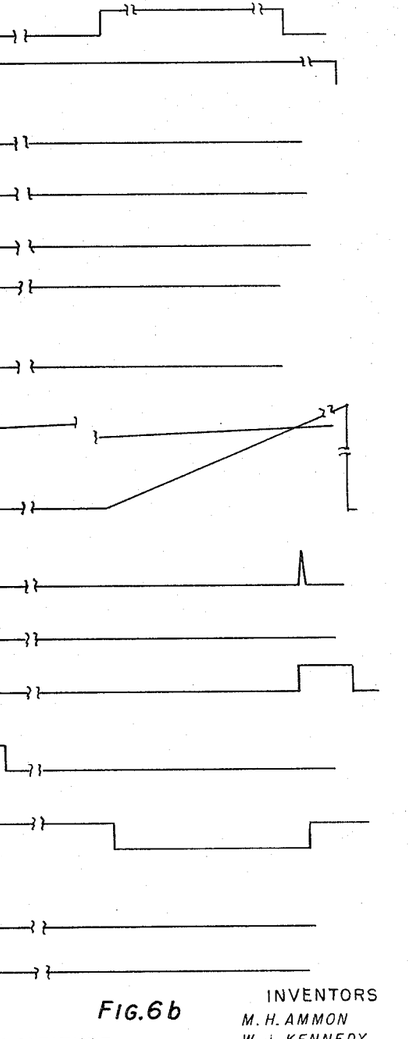

The fast ramp generator 52 producing the waveforms (9) of both FIGS. 5 and 6 of the drawing may be any of the triggered linear sweep circuits well known in the art. The simplest, and one having sufficient accuracy over a limited sweep range for application in this system, is the resistance-capacitance network integrating circuit. A typical circuit of this type used for a triggered sweep signal generation is shown in Millman and Taub supra, on page 212 in FIGS. 7–11. Other suitable circuits are the thyratron triggered sweep circuit of FIG. 7–7 and the "Miller" integrator of FIGS. 7–19 of the same reference work.

Figure 4:
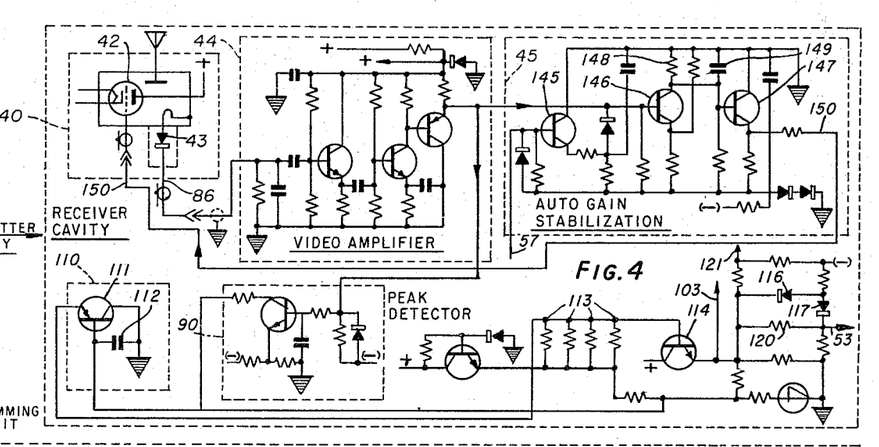
FIG. 4 is an electrical schematic of the receiver of the altimeter.

The details of the slow ramp generator 50 may be seen in FIG. 4. It includes a capacitance multiplier 110 made up of transistor 111 and capacitor 112. The capacitance multiplier 110 with a resistance network 113 is connected as a charging circuit to the base electrode of the transistor 114. The output of transistor 114, in the form of a slow ramp voltage, is taken off the emitter of transistor 114 and applied directly to the programming circuit 14 through lead 103. The same ramp is also introduced into a network including diodes 116 and 117. A voltage which is a function of the output voltage of transistor 114 is tapped off through resistor 120 to produce a ramp having a lower slope, and that ramp voltage is introduced into the voltage comparator over lead 53. This initial lower slope is desired so that it is possible to sample at smaller increments of altitude when operating at low altitude. The diode network is used to bypass resistor 120 when the voltage at the emitter of transistor 114 reaches a selected level. At that point the ramp on lead 53 continues at a lesser slope. The slope of the second section is substantially the same as that of the ramp appearing on lead 103. The control output for the relay 70 operating coaxial switches 23 and 24 to bypass the microwave switch 25 at altitudes above 500 feet is taken from the slow ramp generator over lead 121.

The synchronizing circuit additionally includes a monostable multivibrator 56 having a pulse width greater than the period of the pulse rate frequency generator 30. This monostable multivibrator 56 having a period, for example, of 400 microseconds, is used to blank or disable the automatic gain stabilization circuit 45 and the transmitter 10 on alternate cycles as is hereinafter explained.

TIME COMPARATOR

The time comparator circuit of the altimeter of FIG. 1 includes a pair of trigger pulse generators, identified as the start gate 60 and the stop gate 61. The start gate 60 is operatively connected via lead 62 and the programming circuit 14 to be triggered by energy from the modulator 21 at the instant an RF pulse is transmitted, and the stop gate is directly connected via lead 63 and a delay network 64 to be triggered by the grid pulser 46 at the instant that the grid pulser 46 enables the receiver cavity 40. The start and stop gates 60 and 61 are connected to an accurate ramp generator 65, respectively, to start and stop the generation of the altitude ramp waveform. The altitude ramp generator 65 is connected to a peak detector 66 and the level of voltage detected displayed on an indicator 67 as a measure of altitude.

PROGAMMING CIRCUIT

The one additional section of the altimeter circuitry is the programming circuit 14 operating on the transmitter 10 to vary the width of the transmitted pulse. The programming circuit 14 operates to limit the pulse width to approximately six nanoseconds at measured altitudes of from 0 to 50 feet, and between altitudes of 50 feet to 500 feet the pulse width is proportionally increased to a width of .1 microsecond, the full width of transmitted pulse. Above 500 feet the pulse width remains constant.

The programming circuit includes three elements: a peak clipper 100 connected to the output of the modulator 21 to derive a flat-top pulse of length equal to that of the modulator pulse applied to the transmitter cavity; an unblanking gate 101 also connected to the modulator to derive a narrow voltage spike of opposite polarity from the blanking pulse developed by the peak clipper; and a programming gate 102 which is connected over lead 103 to the slow ramp generator 50 to develop a voltage which varies with the voltage of the slow ramp and is connected to the unblanking gate 101 to vary the width of the unblanking pulse. Both the peak clipper 100 and the unblanking gate 101 are connected to the microwave switch 25 over lead 74 so as to open the microwave switch 25 to conduction of RF energy during the entire period of the modulator pulse except for the brief period of the unblanking pulse.

OPERATION

The interaction of these component circuits of the altimeter may be more clearly understood by reference to FIG. 1 and FIG. 5, showing the sequence of operation with the altimeter at low altitude, e.g., 0 to 500 feet. With the application of power to the altimeter, the pulse rate frequency generator 30 starts, and the output pulses shown as waveform (1) of FIG. 5a are conducted via lead 31 through the normally closed switch 32 in the transmitter circuit to the trigger 33, which in turn produces a high-amplitude triggering pulse, waveform 5a(3) for the modulator 21. The modulator 21 produces an output pulse 5a(4) which excites the transmitter oscillator 20, producing an output radio frequency pulse 5a(5) in the order of one kilowatt with a pulse duration in the order of .1 microsecond conducted over lead 16 through coaxial switch 23 under the control of a relay 70 and then through an attenuator pad 71 to the microwave switch 25, and thence through coaxial switch 24 to the transmitting antenna 26.

Simultaneously, a portion of the output of the modulator 21 on lead 72 is introduced into a peak clipper 100 to produce a flat top blanking pulse, as shown in FIG. 5 as plots 5a(6) and 5b(6) of the same duration as the modulator pulse. This blanking pulse is applied to open the microwave switch 25 through lead 74 for the entire period during which RF energy appears at its input terminal. The modulator output is also introduced through lead 73 to an unblanking gate 101 employing a transistor operated in the avalanche mode to produce an extremely narrow negative or unblanking pulse on leads 76 and 74 which is likewise applied to the microwave switch 25. The composite waveform of the blanking and unblanking inputs to the microwave switch 25 is shown as curve 5a(6). The net effect of these two control inputs to the microwave switch is that the switch 25 is held in its nonconducting condition during the transmitted pulse except for the brief instant of approximately 6 nanoseconds when the unblanking pulse is present at the control input to the microwave switch 25. A narrow RF pulse on a low level pedestal 5a(7) passing through the microwave switch 25 and the coaxial switch 24 is fed to the transmitting antenna 26 from which it is transmitted toward the ground. The pulse from the unblanking gate 101 is additionally conducted through leads 76 and 62 as the triggering input to the start gate 60 of the time comparator 13, thereby beginning the generation of the altitude ramp 5a(15) coincident in time with the transmitted pulse.

The 3-kc. pulse from the PRF generator 30, in addition to the function described above in connection with the transmission cycle, is introduced through lead 51 to the fast ramp generator 52 to start that ramp voltage which is in turn introduced into the voltage comparator 55 via lead 54. The voltage comparator 55 also has an input voltage over lead 53 from the slow ramp generator 50 which, as indicated above, is free-running. The voltage comparator 55 produces an output pulse 5a(10) which is delayed in time from the initiation of the 3-kc. gate pulse by an amount which is a function of the level of the slow ramp. This in essence is an electronic delay line with the delay proportional to the voltage level of the D.C. or slow ramp input. For example, if the slow ramp, repeating at a 20-second cycle, is instantaneously at a low voltage level V, and that voltage is introduced over lead 53 to the voltage comparator 55, coincidence appears between that voltage V and the output from the fast ramp generator 52 at a finite delay after the beginning of the pulse from the 3-kc. gate generator. At the moment of coincidence, the voltage comparator 55 provides an output pulse over lead 82 to the grid pulser 46, producing a pulse 5a(12) introduced into the grid of the triode 42 in the receiver oscillator 40 over leads 83 and 150 and into the stop gate 61 over a lead 63 and a delay network 64. The stop gate 61 is operative to stop and hold the altitude ramp 5a(15) at its maximum level attained during the period after it was initiated by the start gate 60. This maximum level is peak-detected and is introduced into a D.C. measuring meter 66, the reading of which represents the time delay between the RF transmitted pulse and the time of generation of the grid pulse.

If the ground return from the transmitted pulses reaches the receiver cavity 40 at the same instant of the grid pulse, the oscillator 40 is triggered into high level oscillation and the energy in the cavity 40 is detected and passed to amplifier 44 in which the envelope is amplified, and thence through lead 87 to a peak detector 90, the output of which is introduced into the slow ramp generator as a D.C. bias to effectively hold its output voltage at the same level. With the slow ramp held at a relatively constant level, the next succeeding pulse applied to the grid of the receiver triode 42 will be at the same delay relative to the next RF pulse. Thus our delay now becomes a function of the transmission time of RF energy from the transmitting antenna to the ground and returned to the receiving antenna, to wit: a function of altitude.

If on the other hand there was no RF energy in the receiver cavity 40 at the time the grid pulse was applied to the triode 42 initially, then insufficient energy is detected in the cavity 40 to produce a slow ramp stopping voltage, and the slow ramp continues to advance. As long as the slow ramp continues to advance, the pulse applied to the grid of the receiver on succeeding cycles is increasingly delayed in time relative to the starting time of the RF pulse. This cycle will continue with the output of the slow ramp generator 50 increasing in voltage until an acquisition of a ground return or echo is made, at which time the slow ramp is stopped.

As indicated above, the slow ramp generator 50 is independent of the timing of the rest of the altimeter so that the output voltage at the instant of transmission of the first RF pulse may have been greater than the voltage required to provide coincidence in the receiver cavity between the grid pulse and the ground return. The altimeter thereupon would search on succeeding transmission cycles to the end of the slow ramp, and automatically the ramp returns to zero output and begins the next cycle. Under these circumstances, acquisition would occur only after the slow ramp was terminated and began again. The period of the slow ramp is, for example, 20 seconds, so that the maximum time required for the altimeter to lock onto a valid signal is 20 seconds. The 20-second period is significantly less than the normal warm-up time for electronic apparatus so that no significant delay is encountered in making acquisition after the energizing of the altimeter.

This description of the pulse cycle of the altimeter is described as applying to the low altitude case, as shown in FIG. 5a. The same cycle appears in FIG. 6a for the high altitude case, with the only differences being that the transmitted RF pulses 6a(7), in the case of high altitude, is of the same width as the pulse 6a(5) applied to the microwave switch 25, rather than a narrow spike as in the low altitude case, the stop gate output 6a(14) is delayed in time and the altitude ramp 6a(15) is, of course, longer.

A significant difference does appear between the low and high altitude cases in alternate cycles, at which time no RF pulse is transmitted. This difference is pointed out below in the section entitled, "Low Altitude Receiver Blanking."

LOW ALTITUDE RECEIVER BLANKING

Since this altimeter is designed for accurate measurement down directly to the zero altitude, a problem exists in that the ground return can appear before the end of the transmitted pulse. This problem may be minimized by employing an extremely narrow transmitted pulse $5a(7)$. However, to insure that the receiver 11 does not detect the transmitted pulse as a ground return at these extremely low altitudes, an additional circuit is present to disable the receiver 11 during the period of the narrow transmitted pulse. This circuit is a coincidence or AND gate 47 having as one input the lead 48 from the grid pulser 46 and as the second input the lead 49 from the unblanking gate 101. Whenever coincidence appears between the grid pulse $5a(12)$ and the unblanking pulse $5a(6)$, the latter appearing at the same time as the transmitted pulse shown by dashed lines in waveform $5a(11)$ of the drawing, the coincidence gate 47 produces an output pulse $5a(11)$ applied to blank the receiver 40 by over-riding presence of the grid pulse $5a(12)$.

Even though the technique of detecting coincidence between the sensitive period of the receiver and the transmitted pulse and then blanking the receiver is used, the possibility of leakage energy from the transmitter 10 to the receiver 11 *following* the RF transmitted pulse exists. This is true since the narrow pulse was actually derived from a broad pulse in the microwave switch 25 and the switch lacks perfect isolation. Protection from receiver triggering by the RF pedestal following the transmitted pulse is achieved through the operation of the automatic gain stabilization portion of the receiver 11.

AUTOMATIC GAIN STABILIZATION

The wave shape of the output of the transmitter 10 at low altitudes appears as a narrow pulse superimposed on a wider base or pedestal, as shown in curve $5a(7)$, the pedestal being the leakage energy past the microwave switch 25 and other leakage in the system. In order for the receiver 11 to be sensitive to detect the first ground return following the narrow transmitted spike and not be triggered by the following portion of the pedestal, it is essential that the receiver 11 sensitivity be adjusted to a level L just above the pedestal at the instant the RF pulse ends. This is accomplished by the automatic gain stabilization circuit. Of course, it is recognized that the automatic gain stabilization circuit cannot be adjusted to the proper level to discriminate against the pedestal in the presence of either the RF pulse or the ground return from the pulse since the response of the AGS circuit 45 is purposely slow. Therefore, the AGS circuit is disabled during the pulse transmission and reception cycle. In order to have an instant when the AGS circuit 45 can be operative and adjust the receiver sensitivity, the altimeter includes a switch which disables the transmission of the narrow RF pulse while allowing the transmission of the pedestal on alternate cycles. The pedestal is of low level and it does not give sufficient ground return to trigger the receiver cavity 40 into high level oscillation, appearing only as clutter or noise. It does pass through the transmitter cavity and appears in the receiver as leakage. The leakage and ground return energy is detected, amplified, and introduced into an AGS circuit 45, the details of which may be seen in FIG. 4.

The alternate enabling of the unblanking gate and AGS circuit is accomplished by the monostable multivibrator 56 having a 400-microsecond width $5a(2)$. This multivibrator 56 is triggered by the differentiated trailing edge of the pulse from the 3-kc. gate generator 30, so that on the next succeeding cycle the monstable multivibrator 56 will be in its operated condition, and the unblanking gate 101 via leads 57 and 58 is disabled so that no narrow RF pulse reaches the transmitter cavity 20. The same pulse from the monostable multivibrator 56 enables the AGS circuit 45 over lead 57. The automatic gain stabilization circuit 45 details may be seen in FIG. 4 as including a transistor 145 operated as a switch under the control of input pulses on lead 57 from the 400-microsecond gate 56, and two stages 146 and 147 of D.C. amplification with an integrating network including resistor 148 and capacitor 149 therebetween. The input to the first stage 146 is the amplified video signal from amplifier 44. The output of the AGS circuit on lead 150 is introduced into the grid of the triode 42 in the receiver cavity 40 to adjust its normal grid bias in accordance with the average output of the receiver 11 during the period that the AGS circuit 45 was enabled; i.e., on alternate cycles of RF pulses.

During these alernate cycles of operation at low altitude when the modulator 21 is triggered and the pedestal $5b(7)$ of RF energy actually reaches the microwave switch 25, the leakage between the transmitter 10 and receiver 11 branches of the altimeter, along with any ground return from the pedestal $5b(7)$, constitute the input to the AGS circuit 45 to set the level of the receiver 11.

At high altitude, with the relay 70 in operated condition and the microwave switch 25 bypassed, any energy from the transmitter cavity 20 directed toward the transmitting antenna 26 actually would be transmitted and would effectively prevent the establishment of a proper AGS level for the receiver 11. Therefore, on the alternate cycles at high altitude with the microwave switch bypassed, it is essential that the transmitter cavity 20 be prevented from breaking into oscillation, and the AGS level set on noise detected by the receiver cavity 40. This allows the setting of the receiver sensitivity at an extremely high level for high altitude operation where the ground return is normally greatly attenuated. This is accomplished by the connection of the 400-microsecond gate 56 to the switch 32 via lead 36. The output of the 400-microsecond gate 56 is used to disable or open the switch 32 during alternate cycles and thereby prevent the modulator 21 from being triggered. This operation is illustrated in FIG. 6b, showing the operated period $6b(2)$ of the 400-microsecond gate and the fact that no modulator pulse or any RF energy is generated (waveforms (3), (4), (5), and (6)). The operation of AGS circuit 46 at high altitude is the same as in the case of low altitude operation.

MODULATION

Figure 3:
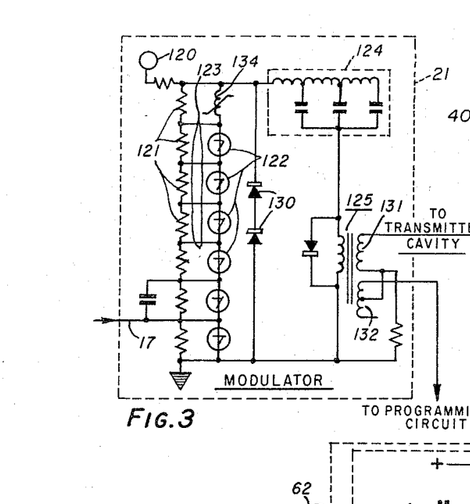
FIG. 3 is an electrical schematic of the modulator of the system.

For successful operation of the altimeter it is essential that sufficient RF energy is produced in the transmitter oscillator 20, for example, 1 kw. at maximum altitude of 5000 feet. Owing to the limitations on the efficiency of the transmitter cavity 20 it is essential that the modulator 21 triggering the oscillator 20 be capable of furnishing peak pulse power in the order of 10 times the transmitted RF energy. In order to achieve this peak pulse power, the modulator of FIG. 3 is employed. It comprises a voltage source 120 with a number of equal resistors 121 forming a voltage divider to ground and a parallel branch made up of a chain of series connected four layer semiconductor diodes 122 having a sharp voltage break-over characteristic. The voltage across each diode is stabilized by cross connections 123 to the voltage dividing resistors. Also connected across the voltage supply is a pulse forming network 124 including an inductor and three capacitors with the network in series, with the primary of an output transformer 125. A pair of reversely connected diodes 130 are used to limit the overshoot current after the voltage pulse from the modulator. The level of limiting of the overshoot is just sufficient to extinguish the conduction of the four layer diodes 122. One secondary winding 131 of the transformer 125 is connected to the transmitter oscillator 20 and a second secondary winding 132 is connected to the programming circuit 14 of FIG. 1.

In series with the chain of four layer diodes 122 is a saturable reactor 134 which functions to delay the buildup of current through the chain of diodes during the transition period from the high voltage to low voltage condition upon the application of a pulse to the modulator on lead 17. In the absence of the saturable reactor 134 the finite time required for switching of the diodes 122 results in a period during which there is significant voltage across each individual diode 122 and likewise current flowing through the diode. The inherent diode resistance during that transition period results in power loss in the diode which would exceed its power dissipation capacity.

RECEIVER ENABLING VOLTAGE COMPARISON

The instant of enablement of the receiver 11 is determined by the voltage comparator 55 of FIG. 1 detecting coincidence in value between the fast ramp, time related to the RF transmission and the slow ramp which is free-running and independent in timing.

The voltage comparator 55 includes a single transistor 140 which is operated in the avalanche mode. The voltage comparison operation is performed by applying one ramp voltage to the base electrode over lead 54 and the second ramp voltage to the emitter over lead 53. The collector-base junction of the transistor 140 is normally biased into the reverse breakdown region to produce the avalanche mode operation, and a dynamic load in the form of a capacitor 141 connected to a resistor 142 through a voltage source is connected to the collector circuit.

When the base and emitter ramp voltages are equal except for the threshold of the base emitter junction, the transistor avalanche mechanism causes the transistor to switch to a second avalanche operating point causing a negative voltage excursion in the collector circuit. The leading edge of the collector voltage spike is independent of the ramp voltage slopes. This affords a rapid rising pulse to the grid pulser at the instant of coincidence of the ramp voltages.

PULSE WIDTH PROGRAMMING

One further problem in connection with the altimeter is that the narrow RF pulse desirable, as described above, at low altitudes becomes inadequate at higher altitudes where pulse width limiting results in limitation in the peak signal strength of the ground return. Pulse width limiting occurs because all of the energy transmitted does not return at the same time to contribute to the peak value of the return pulse. This problem is solved by the programming or broadening of the RF transmitted pulse as a function of the altitude when the actual altitude reaches a level, such as 30 feet, where pulse width limiting becomes a factor. The RF pulse is broadened until such a level as 500 feet is reached, at which time the full RF pulse generated is transmitted. At that time the microwave switch 25 is bypassed by operation of relay 70 and the full RF pulse amplitude and width is passed to the transmitting antenna 26.

The programming of the pulse width is accomplished by connecting the slow ramp generator 50 to a program gate 102 of the programming circuit 14, which in turn is connected to the unblanking gate 101 to vary the width of the unblanking pulse applied to the microwave switch 25. At low altitudes where the D.C. level of the slow ramp voltage is low, the program gate is inoperative, but as a level equivalent to approximately 30 feet is passed as indicated by the voltage output of the slow ramp generator 50, the program gate 102 provides a varying bias for an active element in the unblanking gate 101 to increase the unblanking pulse width.

TIME COMPARATOR

Figure 2:
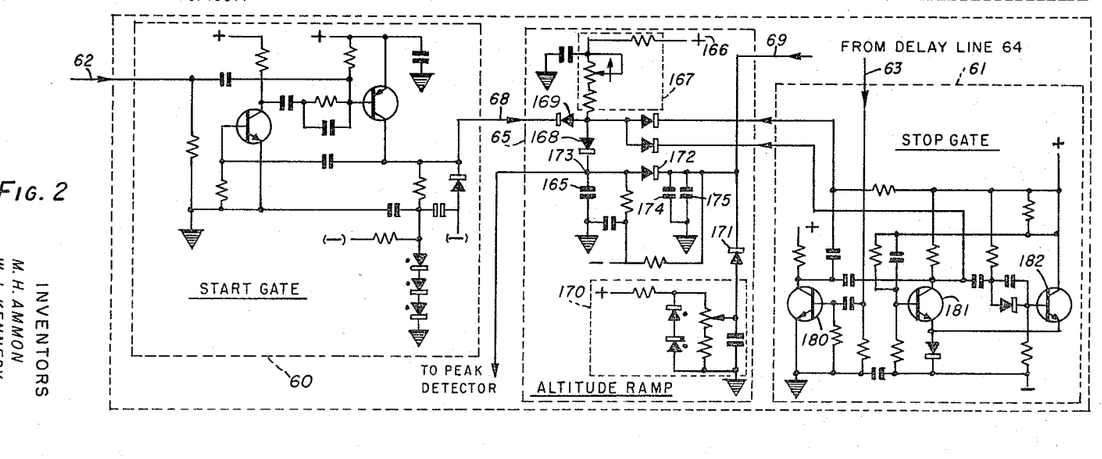
FIG. 2 is an electrical schematic of the time-measurement system of this invention.

The delay between the transmission of the RF pulse and the triggering of the receiver cavity 40 is measured by the time comparator 13 employing primarily a start gate 60 for initiating an accurate altitude ramp (waveform 15) produced by a generator 65 and a stop gate 61 which terminates the altitude ramp. The maximum output of the altitude ramp is detected by peak detector 66 and represented on meter 67 as a D.C. voltage calibrated in terms of altitude. The start gate 60, as may be seen in FIG. 2, is a monostable multivibrator triggered by a negative pulse on lead 62 to produce a positive pulse over lead 68 to altitude ramp generator 65. The altitude ramp generator 65 includes primarily an RC network with a storage capacitor 165 with one electrode grounded and the other electrode clamped to essentially ground by diodes 168 and 169 and the stabilized D.C. supply over lead 68. In the presence of a positive pulse on lead 68, the capacitor 165 begins to charge toward the positive supply voltage 166 through the resistance network 167. The altitude ramp generator 65 also includes a stabilized voltage source 170 applied to the anode of the diode 171 connected in series opposition with diode 172 to the ungrounded electrode of capacitor 165. When the voltage of point 173 exceeds that of the supply 170, the diode 172 becomes conducting, adding additional capacitance of capacitors 174 and 175 to that of capacitor 165. This decreases the slope of the charging voltage or altitude ramp. The two-step altitude ramp allows increased accuracy at low altitudes by requiring a higher millivolt change per foot of altitude at low levels than at high levels.

The altitude ramp continues charging toward the supply voltage 166 until it is terminated by an input from the stop gate 61, which is in turn triggered by the grid pulser 46 over lead 63 at substantially the instant that the receiver cavity 40 is enabled. The stop gate 61 includes a transistor 180 operated in the avalanche mode to provide a narrow negative spike with a fast rise time which is applied to discharge rapidly the capacitor 165 of the altitude ramp generator 65. Because of the short duration of the spike in the transistor 180, a broader negative pulse is generated in a monostable multivibrator made up of transistors 181 and 182, the output of which is similarly applied to the capacitor 165 to discharge it rapidly and thereby terminate the altitude ramp. An additional discharging voltage for the capacitor 165 is derived from the 400-microsecond gate 56 on alternate cycles and introduced over lead 69 to reset the altitude ramp.

SUMMARY

It may, therefore, be seen in accordance with this invention that a distance-measuring system of the radar type may be produced to give accurate measurement of altitude down to 0 feet for the aircraft on which it is located. Measurement of the pulse echo period of transmissions from the underside of an aircraft resting on the ground requires the accurate measurement of periods in the order of $4 \times 10^{-9}$ seconds. This is accomplished through the use of pulse type transmissions and a superregenerative receiver normally maintained in an insensitive condition but periodically enabled. The receiver enablement is under the control of two timing sources, one of which is time-related to the start of each RF transmission and the other of which is independent of transmission time. The detection of an echo during the receiver-enabled period serves to temporarily stop the independent timing source. Distance is measured as a function of the independent timing source and not any received echo.

Accurate measurement to low altitudes is enhanced by the technique of narrowing the RF transmitted pulse as a function of altitude and further by automatically adjusting the sensitivity of the receiver dependent upon the amount of leakage energy reaching the receiver during periods on alternate cycles when the transmitter is active but no narrow RF pulse is transmitted.

Accuracy of measurement is also facilitated by the presence of a novel voltage comparator employing a single active element having an output characteristic upon coincidence of two input voltages, the wave shape of the output being independent of the rise time of either of the input voltages.

The successful generation of an RF pulse of adequate power is accomplished employing a solid state modulator constituting one facet of this invention for generating a high power modulator pulse while limiting the power dissipation in the active elements of the modulator to a level well below their operating limits.

Although for the purpose of explaining the invention a particular embodiment thereof has been shown and described, obvious modifications will occur to a person skilled in the art, and we do not desire to be limited to the exact details shown and described.

We claim:
1. In a pulse echo distance-measuring system:
a pulse transmitter;
a pulse receiver;
means for periodically energizing said transmitter to transmit a pulse of traveling wave energy;
means for generating a first time-variable voltage time-related to the transmission of said pulse;
means for generating a second time-variable voltage independent of the time of transmission of said pulse;
a voltage comparator for said first and second time variable voltages;
means responsive to the output of said voltage comparator at coincidence of said first and second voltages for enabling said pulse receiver;
means for measuring the time interval between the energizing of said pulse transmitter and the enablement of said pulse receiver; and
means for representing the measured time interval as a function of distance.

2. In a pulse echo distance-measuring system:
a pulse transmitter;
a normally disabled pulse receiver;
means for periodically energizing said transmitter to transmit a pulse of traveling wave energy;
means for generating a first time-variable voltage time-related to the transmission of said pulse;
means for generating a second time-variable voltage independent of the transmission of said pulse;
a voltage comparator for said first and second time-variable voltages;
means responsive to coincidence of said first and second time-variable voltages in said voltage comparator for enabling said pulse receiver;
means responsive to the detection of an echo by said enabled receiver for temporarily changing the time-voltage variation characteristic of said second time variable voltage-generating means; and
means for representing the time interval between the energizing of said transmitter and the changing of the time-voltage variation characteristic of said second time variable voltage generating means as an indication of distance as represented by the pulse-echo interval.

3. In a pulse echo distance-measuring system:
a pulse transmitter;
a normally disabled pulse receiver;
means for periodically energizing said transmitter to transmit a pulse of traveling wave energy;
means for generating a first ramp voltage having a starting time related to the starting time of the transmitted pulse;
means for generating a second ramp voltage having a lesser slope than the first ramp voltage and independent of the timing of the transmitted pulse and first ramp;
a voltage comparator for the first and second ramp voltages;
means responsive to the output of said voltage comparator at coincidence of said first and second ramp voltages for enabling said pulse receiver;
means for measuring the time interval between the energizing of said pulse transmitter and the enablement of said pulse receiver;
means for representing the measured time interval as a function of distance; and
means responsive to the detection of an echo by said enabled receiver for temporarily stopping the advance of the second ramp voltage.

4. In a pulse-echo distance-measuring system:
a pulse transmitter;
a pulse receiver;
means for periodically energizing said pulse transmitter to transmit a pulse of traveling wave energy;
means for generating a first ramp voltage having a starting time related to the starting time of the transmitted pulse;
means for generating a second ramp voltage having a lesser slope than the first ramp voltage and independent of the timing of the transmitted pulse and first ramp;
a voltage comparator for the first and second ramp voltages;
means responsive to coincidence of the first and second ramp voltages in said voltage comparator for enabling said receiver;
a third ramp voltage generator;
first triggering means for said third ramp voltage generator responsive to the generation of a pulse in said transmitter for starting the third ramp voltage;
second triggering means for said third ramp voltage generator responsive to the enablement of said receiver for terminating the third ramp voltage; and
means for representing the maximum level of said third ramp voltage as a measure of distance.

5. The combination in accordance with claim 4 wherein said voltage comparator comprises:
a transistor having base, emitter and collector electrodes;
means for biasing the base-collector junction beyond breakdown;
means applying one of said ramp voltages to the emitter electrode and the other of said ramp voltages to the base electrode whereupon coincidence of substantially equal voltages on the base and emitter electrode produce a rapid change in the conduction characteristics of the base-collector junction, producing an output voltage pulse in the collector circuit having a leading edge independent of the slope of said ramp voltages.

6. A voltage comparator comprising:
a transistor having base, emitter and collector electrodes;
means for biasing the base-collector junction beyond breakdown;
means for applying one voltage to be compared to the emitter electrode of said transistor;
means for applying the second voltage to be compared to the base electrode of said transistor whereupon coincidence of substantially equal voltages on the base and emitter electrodes produces a rapid change in the conduction characteristics of the base-collector junction, producing an output voltage pulse in the collector circuit having a leading edge independent of the rise time of the applied voltages.

7. In a pulse echo distance-measuring system:
a pulse transmitter;

a pulse receiver;

means for periodically energizing said pulse transmitter to transmit a pulse of traveling wave energy;

a normally disabled automatic gain control circuit for said receiver;

means for periodically preventing the transmission of energy from the energized transmitter; and means for simultaneously enabling said automatic gain control circuit whereby the gain of said receiver is set relative to leakage energy received from said transmitter.

8. In a pulse echo distance-measuring system:

a pulse transmitter;

a pulse receiver;

a normally disabled automatic gain control circuit for said receiver;

switch means in the output of said transmitter;

means for opening said switch means to effectively prevent the transmission of radio frequency energy from the energized transmitter; and means for simultaneously enabling said automatic gain control circuit.

9. The combination in accordance with claim 8 including a switching pulse generator having a period between one and two times the period of the means for periodically energizing said transmitter whereby radio frequency pulses are transmitted and the gain of said receiver is adjusted on alternate cycles.

10. In a pulse echo distance-measuring system:

a pulse transmitter including a switch;

a pulse receiver;

means for periodically energizing said pulse transmitter to generate a pulse of traveling wave energy;

means for generating a time-variable voltage independent of the timing of the generation of traveling wave energy;

said time-variable voltage means being connected to enable said receiver after a delay from the energizing of said transmitter which delay is a function of the instantaneous magnitude of said time variable voltage;

means for opening the switch in said transmitter during substantially the entire period of generation of energy to prevent the transmission of the generated energy; and gate means operated by said time-variable voltage generator for closing the switch in said transmitter for a period of time shorter than said period of energy generation and varying as a function of the instantaneous magnitude of said time-variable voltage whereby the transmitted pulse varies in width with the time delay between transmitter and receiver enablement.

11. In a pulse-echo distance-measuring system:

a pulse transmitter including a switch in the output stage thereof;

a pulse receiver;

means for periodically energizing said pulse transmitter to generate a pulse of traveling wave energy;

means for generating a first time-variable voltage time-related to the transmission of said pulse;

means for generating a second time-variable voltage independent of the transmission of traveling wave energy;

a voltage comparator for said first and second time-variable voltages;

means responsive to coincidence of said first and second time-varible voltages in said voltage comparator for enabling said receiver;

means responsive to the generation of energy by said transmitter for opening said switch; and gate means operated by said second time-variable voltage generator for closing said switch for a period varying as a function of the level of the second time-variable voltage whereby the transmitted pulse width varies with the time delay between transmitter and receiver enablement.

12. In a pulse-echo distance-measuring system including means for generating pulses of traveling wave energy, an oscillator, and means normally maintaining said oscillator in a quiescent state, triggering means for said oscillator comprising:

a source of voltage, a semiconductor device having the characteristic of a sharp voltage breakover;

means for applying a pulse to said device to raise the voltage thereacross to above the breakdown voltage whereupon said device switches from a nonconducting to conducting condition;

reactance means in series with said device to delay the rise of current through said device until after the voltage across the device has dropped to below a selected level; and means coupling the transient voltage produced upon the switching of said device to the oscillator to trigger the oscillator.

13. The combination in accordance with claim 12 wherein said reactance means comprises a saturable reactor.

References Cited by the Examiner
UNITED STATES PATENTS

| 2,433,838 | 1/1948 | Elie et al. | 343—13 |
| 2,579,542 | 12/1951 | Bostick | 332—12 |
| 2,780,782 | 2/1957 | Bright | 332—12 |
| 2,946,050 | 7/1960 | Wathen | 343—13 |

RODNEY D. BENNETT, Acting Primary Examiner.

CHESTER L. JUSTUS, Examiner.

L. MYERS, R. E. KLEIN, J. P. MORRIS,
Assistant Examiners.